(No Model.) 4 Sheets—Sheet 1.

J. W. PATTERSON.
CASH REGISTER FOR COIN ACTUATED LOCKS.

No. 423,948. Patented Mar. 25, 1890.

WITNESSES:
John Becker
C. K. Fraser

INVENTOR:
James William Patterson
By his Attorneys,
Arthur C. Fraser (No Model.)  J. W. PATTERSON.  4 Sheets—Sheet 2.
CASH REGISTER FOR COIN ACTUATED LOCKS.
No. 423,948.  Patented Mar. 25, 1890.

WITNESSES:
John Becker
C. K. Fraser

INVENTOR:
James William Patterson
By his Attorneys,
Arthur C. Fraser & Co.

(No Model.) 4 Sheets—Sheet 3.

J. W. PATTERSON.
CASH REGISTER FOR COIN ACTUATED LOCKS.

No. 423,948. Patented Mar. 25, 1890.

WITNESSES:
John Becker
C. K. Fraser.

INVENTOR:
James William Patterson.
By his Attorneys,
Arthur C. Fraser & Co.

(No Model.) 4 Sheets—Sheet 4.

J. W. PATTERSON.
CASH REGISTER FOR COIN ACTUATED LOCKS.

No. 423,948. Patented Mar. 25, 1890.

WITNESSES:
John Becker
C. K. Fraser.

INVENTOR:
James William Patterson
By his Attorneys,
Arthur C. Fraser & Co.

UNITED STATES PATENT OFFICE.

JAMES WILLIAM PATTERSON, OF NEW YORK, N. Y.

CASH-REGISTER FOR COIN-ACTUATED LOCKS.

SPECIFICATION forming part of Letters Patent No. 423,948, dated March 25, 1890.

Application filed October 10, 1889. Serial No. 326,584. (No model.)

*To all whom it may concern:*

Be it known that I, JAMES WILLIAM PATTERSON, a subject of the Queen of Great Britain, residing in New York city, in the county and State of New York, have invented certain new and useful Improvements in Cash-Registers for Coin-Actuated Locks, of which the following is a specification.

This invention provides a device applicable to opera-glass-rental boxes and other analogous devices provided with coin-actuated locks or mechanisms, and designed to indicate the number of times the lock, &c., is operated, and hence the amount of money deposited in it and which the money-collector or cashier should turn over to the management or proprietor. The register thus becomes a check upon the cashier or other person collecting the money and insures to the proprietor the payment to him of the entire amount deposited in or earned by the apparatus.

I have shown my invention as applied to an opera-glass-rental box for theaters, the lid or cover of which is closed by a coin-actuated lock or one which is unlocked by the insertion of a coin. Such boxes are now well known in the art. The particular construction of box to which I have shown my invention applied is that which is provided with a knob on the exterior of the lock-case, which knob is to be turned after the insertion of a coin in order that the inserted coin may be carried around within the case and caused to act upon the lock mechanism to withdraw the bolt. This construction of coin-actuated lock for opera-glasses, &c., is disclosed in the application of Alton H. Faucher, filed July 5, 1889, Serial No. 316,506.

Figure 1:
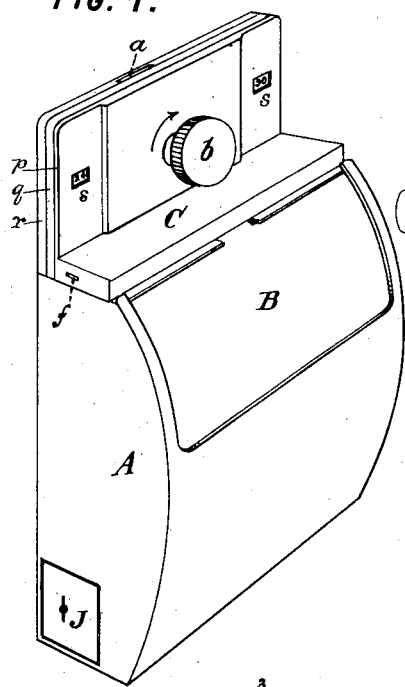
Figure 3:
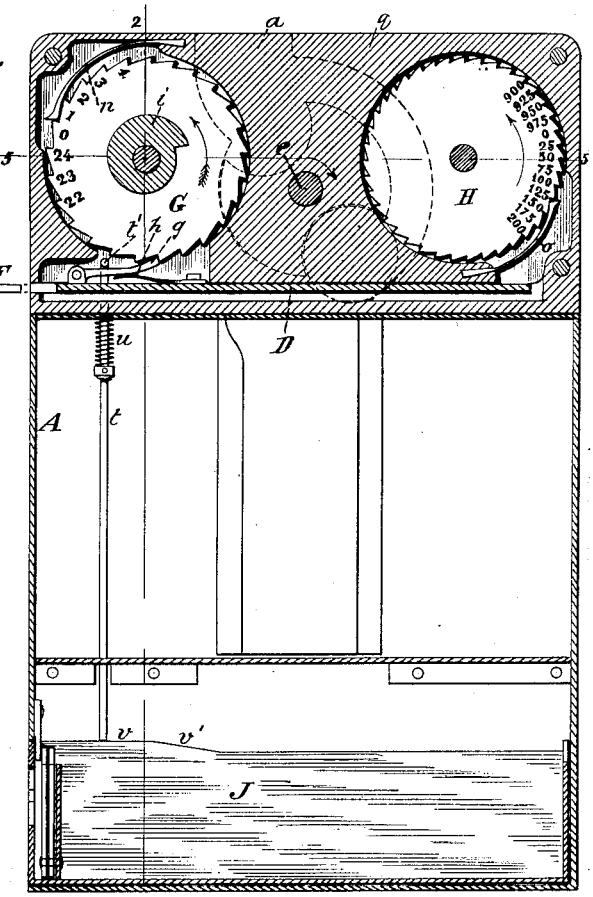
Figure 2:
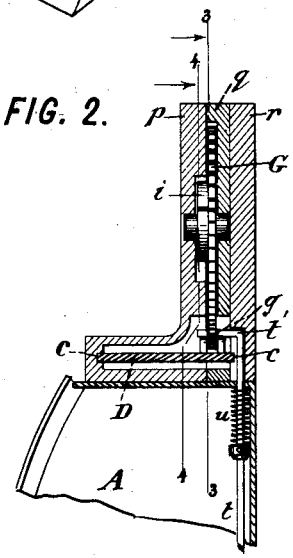
Figure 4:
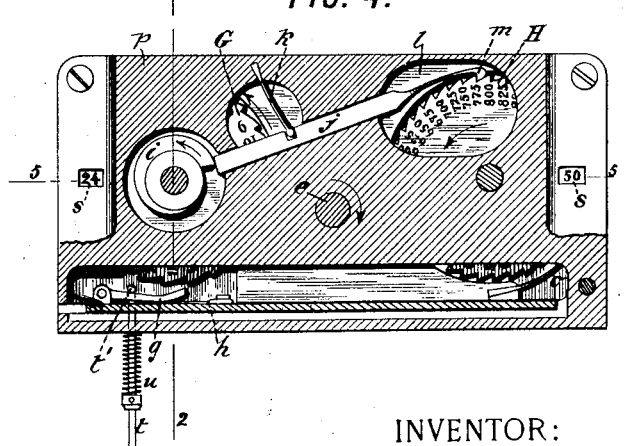
Figure 5:
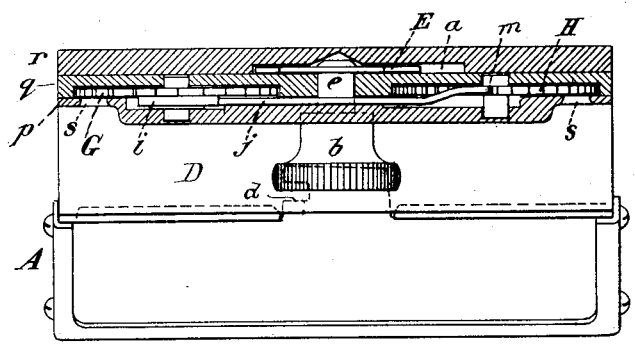
Figure 6:
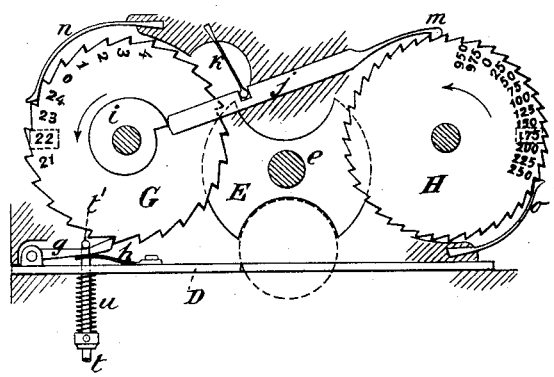
Figure 7:
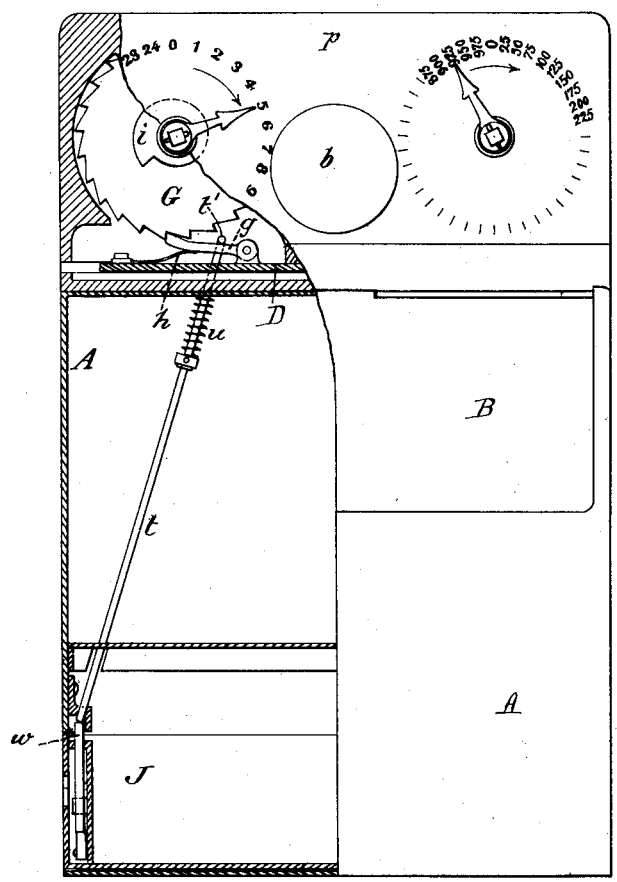
Figure 8:
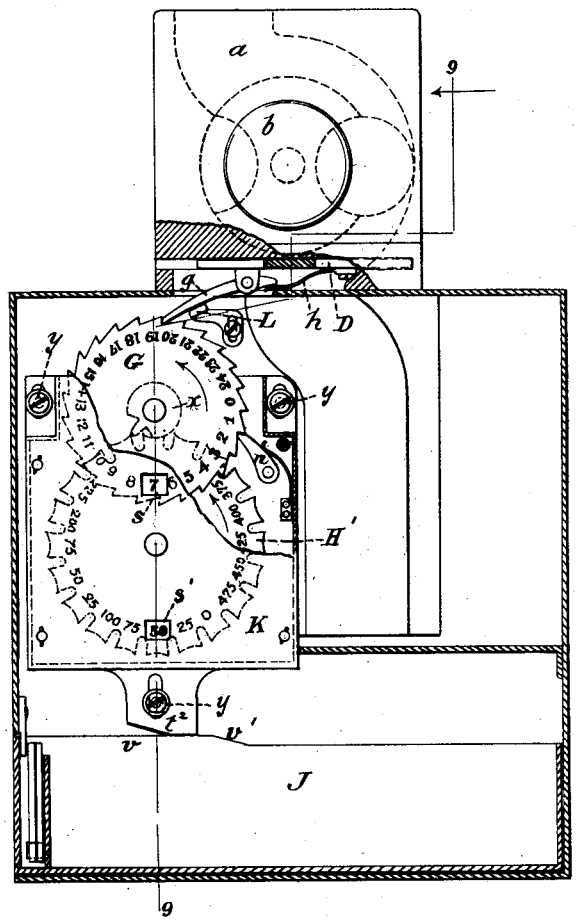
Figure 9:
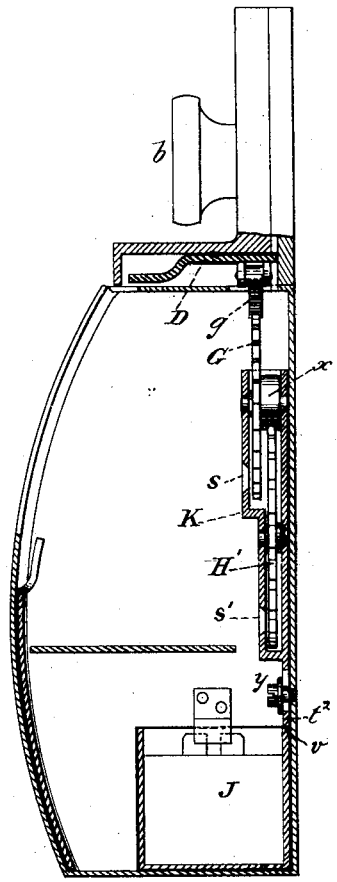
Figure 10:
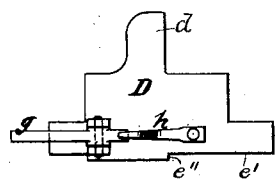

Figure 1 of the accompanying drawings is a perspective view of the box modified in accordance with my invention. Fig. 2 is a vertical transverse section of the upper part of the lock mechanism cut on the line 2 2 in Figs. 3 and 4. Fig. 3 is a front view of the box in vertical section on the line 3 3 in Fig. 2. Fig. 4 is a vertical section similar to Fig. 3, but taken in the plane of the line 4 4 in Fig. 2. Fig. 5 is a horizontal section cut in the line 5 5 in Figs. 3 and 4. Fig. 6 is a front elevation of the working parts of the apparatus with the frame or casing eliminated. Fig. 7 is a fragmentary front view, partly in section, showing a modification. Fig. 8 is a vertical section similar to Fig. 3, but showing a modified construction, the registering mechanism being placed inside the box. Fig. 9 is a vertical section in the two planes denoted by the line 9 9 in Fig. 8. Fig. 10 is an under side plan of the locking-plate and pawl shown in Figs. 8 and 9.

I will first describe the construction shown in Figs. 1 to 6, inclusive. Let A designate the box or receptacle for holding an opera-glass, B its cover or lid, and C the coin-actuated lock by which the cover is fastened or closed. This coin-actuated lock has a coin-slot $a$, into which the prescribed coin—as, for example, a silver dime—is to be inserted, after which the knob $b$ on the front of the lock-casing is to be turned in the direction of the arrow, thereby carrying the coin around and causing it to act after the manner of a cam to operate the lock, whereupon upon the unlocking movement of the lock the lid B falls open and discloses the opera-glass. In the construction of the lock shown the locking or fastening member consists of a sliding plate D, which is movable from right to left, and vice versa, being mounted in guiding-grooves $c\ c$ at its front and rear sides, as best shown in Fig. 2. This plate either constitutes the bolt itself or is connected to and imparts motion to the bolt. Preferably the plate constitutes the bolt, being formed with a projection $d$, (shown in dotted lines in Fig. 5,) which engages a suitable hasp formed on the upper part of the lid B. The operative parts of the lock in the particular construction shown consist of this sliding plate D and a rotative disk or wheel E, (seen best in Fig. 6,) which has a notch or notches in its periphery, into which the coin may partly enter, and which is connected with the external knob $b$ through the medium of a stem $e$, as shown in Fig. 5.

When a coin is inserted into the coin-slot it drops down until it rests upon the disk E. The operator then turns the knob $b$ toward the right until one of the notches in the disk comes into coincidence with the coin, whereupon the coin drops into said notch, and is then by the continued rotation of the disk carried around therewith, and when it reaches the lower side thereof it drops partly out of the notch in the disk and falls against the plate D. This plate D is notched or cut away at its rear edge at $e'$, as shown in Fig. 10. The coin falls against the shoulder $e''$ of this notch, and by the continued turning of the knob the disk E pushes the coin against this shoulder and thereby thrusts the plate D bodily toward the left, thus displacing its projection $d$ out of engagement with the hasp on the lid B, whereby the box is unlocked. After the lock has been thus unlocked it can be relocked only by inserting a special key F (shown in Fig. 3) into a key-hole $f$, in order to push the plate D back toward the right.

The particular lock thus described is claimed in the said application of A. H. Fancher. It should be understood, however, that my present invention has no necessary connection with this or any other specific construction or type of lock or coin-actuated movement. It is shown in connection with this particular lock, because this is one which is actually in use and is most convenient as illustrating the application of my invention.

According to my invention I provide the lock-bolt D or other locking or fastening member or other equivalent moving part of the lock or device with a pawl $g$, which is pivoted to it and is pressed by a spring $h$. This pawl acts in the teeth of a ratchet-wheel G, which constitutes the initial wheel of the register. This ratchet-wheel has any suitable or convenient number of teeth, and is adapted to be turned one tooth at a time by the pawl each time that the lock is operated either to lock it or to unlock it. In the construction shown in Figs. 1 to 6 it is shown as arranged to be advanced when the lock is being locked. In Fig. 7 it is shown arranged to be advanced when the lock is being unlocked. A series of numbers arranged in such succession as to correspond to the successive step-by-step movements of the ratchet-wheel is arranged so that the numbers shall be designated or adjustable in succession by its successive movements. The best way of accomplishing this is to mark the numbers on the wheel G, or on any other wheel deriving motion from it, and arrange them to move successively in to view through an opening in the lock-case, as clearly shown in Figs. 1, 4, and 5. Another means is to mark the figures on the exterior of the lock-case and connect the wheel G with a hand or pointer, which shall be moved by the wheel from one figure to another at each intermittent movement, as shown in Fig. 7. These two means for designating or displaying the successive figures I regard as equivalents.

In the precise construction shown the wheel G has twenty-five teeth and is marked with numbers from 0 to 24. Inasmuch, however, as it is desirable to register higher numbers, and as it is inconvenient to make the wheel with a greater number of teeth and mark a greater number of figures upon it, it is preferable to employ one or more additional wheels to count or indicate the revolutions of the wheel G. For this purpose I have provided a wheel H, which turns the distance of one tooth upon the completion of each revolution of the wheel G. This movement is preferably accomplished by the mechanism best shown in Fig. 4. The wheel G has fixed to it a cam or snail $i$, which as the wheel turns acts to push or slide longitudinally a sliding rod or bar $j$, which is normally pressed back or toward it by a spring $k$. The opposite end portion of the bar $j$ projects freely into a hole or opening $l$ in the casing and is made elastic, and on its end is formed a pawl or tooth $m$, which is adapted to act against the ratchet-teeth of the wheel H. As the snail $i$ presses the bar $j$ to the right, its tooth $m$ snaps over a tooth on the wheel H, and when the wheel G completes its revolution and shows zero at the opening the abrupt face of the snail passes beyond the end of the ratchet $j$ and the latter is pressed back by its spring $k$, and its tooth moves the wheel H the distance of one tooth. The wheel H is preferably marked with figures which are multiples of the number of teeth on the wheel G—that is, with the numbers 25, 50, 75, 100, &c.

To prevent back motion of the ratchet-wheels G and H, I provide them with fixed stop-pawls $n$ and $o$, respectively, as shown in Figs. 3 and 6.

The lock-casing is preferably constructed of three plates—a front plate $p$, a middle plate $q$, and a rear plate $r$—as best shown in Figs. 2 and 5. The coin slide or conduit $a$ and the recess for the wheel E to turn in are preferably formed at the junction of the middle and rear plates, and wholly in one or the other of these plates, or partly in both. The wheels G and H are preferably arranged to turn in recesses formed in the front side of the intermediate plate $q$, while the rear side of the front plate $p$ is recessed to admit the snail $i$ and to provide room for the free operation of the spring $k$ and the flexible end of the rod $j$, which carries the tooth $m$, and is also formed with a groove in which the rod $j$ slides. The openings $s$ $s$ through which the figures are seen are also formed in the front plate. The guiding-grooves for the locking-plate D are formed one in the back plate and the other in the front plate.

It is usual in apparatus of this kind to provide a drawer or other equivalent receptacle into which the deposited coins, after having done their work, fall and are accumulated, and this drawer or receptacle is locked with a special key and the coins are taken from it at suitable intervals by a cashier or money collector. This receptacle is designated at J in the drawings, where it consists of a drawer sliding laterally out through the left-hand end of the opera-glass box. It is customary for the collector at the times that he removes the money from the drawer to pass a coin or two through the lock in order to test its operation and see whether it is in operative condition. It is obvious that such testing operations of the lock should not influence the register, as it would thereby be caused to indicate the deposit of a greater amount of money than had actually been paid into the mechanism. It is desirable, therefore, that the registering mechanism should be thrown out of action during the time that the collector is making such tests, and it is necessary that this disengagement of the register should be effected automatically, and by means beyond the control of the collector, as otherwise he might be able to set the register and leave it out of action at times in order to enable him to appropriate to himself the money paid into it during such times, and thereby cheat the proprietor of the apparatus. To this end my invention provides means for throwing the ratchet-and-pawl movement out of action by separating the ratchet and pawl, and this means is operated by the drawing out of the cash-drawer or by the unlocking thereof, so that the act of unlocking or of unlocking and drawing out the cash-drawer will throw the register out of action until the drawer is replaced, or replaced and relocked. During this time, therefore, the collector may test the action of the lock without counting up a debit against himself. The preferred construction for accomplishing this purpose is that shown best in Fig. 3. A sliding rod or wire $t$ is arranged in the back part of the box, being provided with a spring $u$ tending to press it downwardly, but normally pressed up by the rear side wall $v$ of the drawer J. When the drawer is pulled out, a downward incline $v'$ on this side wall rides under the rod $t$, and the latter is permitted to descend under the pressure of its spring $u$. The upper end of the rod is bent over toward the front, or is otherwise provided with an arm or finger $t'$, which overhangs the pawl $g$, which, when the rod is pressed up, stands sufficiently above the pawl to not interfere with its motion. When, however, the rod is thus pressed down the finger $t'$ is moved down against the pawl, and by reason of the spring $u$ being stronger than the spring $h$ it draws the pawl down and moves it a sufficient distance to carry its free end safely out of the teeth of the ratchet-wheel. The lock may then be operated, the pawl moving back and forth beneath the ratchet-wheel, but without being able to engage with it, so that the register is not operated. When the drawer is pushed back, its incline $v'$ acts to push up the rod $t$ to its normal position. The rod may be operated by the locking or unlocking of the drawer J, as shown in Fig. 7, where $w$ is the locking-bolt by which the drawer J is fastened, and the rod $u$ is arranged with its lower end entering the cavity into which this bolt moves when locked. In the act of unlocking the drawer J the bolt $w$ is drawn down and the rod $t$ follows it, while in relocking the drawer the bolt $w$ presses up the rod $t$ again.

In the construction thus far described the registering mechanism is located above the box proper, and the register can be read while the box is closed. Figs. 8, 9, and 10 show a modified construction, which I will now describe, in which the registering mechanism is arranged within the box and below the lock. In this construction the pawl $g$ is carried underneath the sliding plate D, and it acts to propel the ratchet-wheel G during the unlocking movement of the plate. On the back of the wheel G is fixed the cam-disk $x$ of the Geneva stop-movement, which at the completion of each revolution of the wheel G engages with one of the notches in the second wheel H' and advances it one tooth, the wheel H' being held meanwhile by the engagement of the concentric periphery of the wheel $x$ with the arc-shaped portions of its teeth, as is usual in Geneva stop-movements. The wheels G and H' are mounted in a case K, consisting of front and back plates fastened together and secured to the back of the opera-glass box. The wheel G is marked with numbers, which, as it is turned step by step by the pawl, appear successively through an opening $s$ in the case K of the registering mechanism, and the wheel H' is marked with numbers which are visible through a hole $s'$. A stop-pawl $n$ is provided to prevent any back movement of the ratchet-wheel G. An adjustable stop L is arranged beneath the pawl $g$ in such position that, if the pawl moves back far enough to engage with a second tooth in advance, it will be upheld and prevented from engagement therewith, so that it cannot move the wheel G more than the distance of one tooth. The register-case K is mounted in such manner as to be movable up and down. This can readily be done by providing it with vertically-slotted holes through which the fastening screws or rivets $y$ $y$ are passed. The bottom of the frame terminates in a foot $t^2$, which rests on the upper edge $v$ of the side of the drawer J, when the latter is in place. When the drawer is drawn out, the frame, being no longer supported, falls down sufficiently far to move the teeth of the ratchet-wheel G out of reach of the pawl $g$, which latter is kept from falling by the stop L. When the drawer is reinserted, its incline $v'$ again pushes up the case K and brings the ratchet-wheel again into engagement with the pawl.

While the drawer G is pulled out, the registering mechanism is consequently out of engagement, so that the lock may be tested.

My invention may be otherwise modified, as will be obvious to mechanicians.

I claim as my invention the following-defined novel features or improvements, substantially as hereinbefore specified, namely:

1. The combination, with a coin-actuated mechanism, of a register comprising a ratchet-wheel, a series of figures or characters, and means for designating them in succession, operated by said ratchet-wheel, a pawl for advancing said wheel connected to and moved by the coin-actuated mechanism, a throw-off device for putting the register out of action, so that the operation of the lock may be tested without indicating fictitious deposits of money, and a lock whereby said throw-off device is rendered inoperative or inaccessible, so that only an authorized person having a key to such lock may throw the register out of action.

2. The combination, with a coin-actuated mechanism, of a register comprising a ratchet-wheel, a series of figures or characters and means for designating them in succession operated by said ratchet-wheel, a pawl for advancing said wheel connected to and moved by the coin-actuated mechanism, a receptacle for holding the inserted coins, and a movable connection between the ratchet and pawl and said receptacle, constructed when the latter is closed and locked to leave the ratchet and pawl in mutual engagement, and when the receptacle is unlocked and opened for the removal of the deposited money to separate the ratchet and pawl, so that the movements of the pawl do not influence the register, whereby the money-collector may test the operativeness of the coin-actuated mechanism while said receptacle is open without causing the register to indicate fictitious deposits of money.

3. The combination, with a coin-actuated mechanism, of a register including a ratchet-wheel and a pawl for advancing said wheel connected to and moved by the coin-actuated mechanism, a drawer or receptacle for holding the inserted coins formed with a cam-surface, and a movable connection between the ratchet and pawl and said receptacle arranged to be acted upon by said cam-surface when the receptacle is opened or closed and thereby to separate the ratchet and pawl when the receptacle is unlocked and opened and to bring the ratchet and pawl into engagement when the receptacle is closed and locked.

4. The combination, with a coin-actuated device comprising a reciprocating part or slide, of a register including a pawl carried by said reciprocating part, a ratchet-wheel to be advanced by said pawl, a drawer or receptacle for holding the inserted coins, and a movable connection between said receptacle and the pawl adapted to move the latter out of engagement with the ratchet-wheel when the receptacle is unlocked and opened for the removal of the deposited money.

5. The combination, with a coin-actuated device comprising a reciprocating part or slide, of a register including a pawl $g$, carried by said reciprocating part, a ratchet-wheel G, to be advanced by said pawl, a drawer or receptacle J, for holding the inserted coins provided with a cam-surface $v'$ $v'$, and a throw-off device consisting of a rod $t$, arranged to be moved by said cam-surface as the receptacle J is opened or closed, and constructed to act upon the pawl to withdraw it from the ratchet-teeth upon the opening movement of the receptacle.

6. The combination, with a coin-actuated lock constructed to be unlocked by the insertion of a coin and relocked by a special key, and comprising a reciprocating part deriving its opposite movements from the coin and said key, respectively, of a register comprising a ratchet-wheel, a series of figures or characters and means for designating them in succession operated by said ratchet-wheel, and a pawl for advancing said wheel connected to and operated by said reciprocating part, whereby when the lock is operated said pawl is moved and the registering mechanism indicates the amount of money deposited.

7. The combination, with a coin-actuated lock constructed to be unlocked by the insertion of a coin and relocked by a special key, comprising a reciprocating part deriving its opposite movements from the coin and such key, respectively, of a register comprising a pawl connected to and moved by said reciprocating part, and a ratchet-wheel to be advanced by said pawl, the pawl and ratchet-wheel being arranged so that the pawl shall advance the wheel during the relocking movement of the lock.

8. In a coin-actuated mechanism, the combination, with a casing constructed of three plates fastened together face to face, a reciprocating plate sliding in guides formed in the front and rear plates, respectively, a coin-conduit formed between the middle and rear plates through which a coin may be conducted to act upon said reciprocating plate, a registering wheel or wheels arranged in a recess or recesses between the middle and front plates, and a pawl deriving motion from said reciprocating plate constructed to advance said registering-wheel.

In witness whereof I have hereunto signed my name in the presence of two subscribing witnesses.

JAMES WILLIAM PATTERSON.

Witnesses:
GEORGE H. FRASER,
CHARLES K. FRASER.